US009349547B2

(12) United States Patent
Schaar

(10) Patent No.: US 9,349,547 B2
(45) Date of Patent: May 24, 2016

(54) SWITCHING MODULE FOR VOLTAGE REGULATOR

(71) Applicant: Jonathan Michael Schaar, New Berlin, WI (US)

(72) Inventor: Jonathan Michael Schaar, New Berlin, WI (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 120 days.

(21) Appl. No.: 14/213,384

(22) Filed: Mar. 14, 2014

(65) Prior Publication Data

US 2014/0266142 A1 Sep. 18, 2014

Related U.S. Application Data

(60) Provisional application No. 61/792,531, filed on Mar. 15, 2013.

(51) Int. Cl.

| | |
|---|---|
| ***G05F 1/253*** | (2006.01) |
| ***G05F 1/33*** | (2006.01) |
| ***G05F 1/34*** | (2006.01) |
| ***H02M 7/00*** | (2006.01) |
| ***H01H 9/00*** | (2006.01) |

(52) U.S. Cl.
CPC .......... *H01H 9/0027* (2013.01); *H01H 9/0038* (2013.01)

(58) Field of Classification Search
USPC ......... 323/250, 251, 254, 255, 259, 262, 264; 363/64, 106, 107
See application file for complete search history.

(56) References Cited

U.S. PATENT DOCUMENTS

| | | | | |
|---|---|---|---|---|
| 3,206,580 | A | 9/1965 | McCarty | |
| 3,594,631 | A | 7/1971 | Trachsel | |
| 3,612,786 | A | 10/1971 | Whitman | |
| 3,789,688 | A * | 2/1974 | Minks | B63H 23/30 192/142 R |
| 5,107,200 | A | 4/1992 | Dohnal et al. | |
| 5,266,759 | A | 11/1993 | Dohnal et al. | |
| 6,060,669 | A | 5/2000 | Dohnal et al. | |
| 7,463,010 | B2 | 12/2008 | Dohnal et al. | |

(Continued)

FOREIGN PATENT DOCUMENTS

| | | | |
|---|---|---|---|
| GB | 1340356 | A | 12/1973 |
| RU | 1838844 | A3 | 8/1993 |
| RU | 2115187 | C1 | 7/1998 |

OTHER PUBLICATIONS

The International Search Report and Written Opinion for Corresponding Application No. PCT/US2014/028934, Mailed Sep. 11, 2014, 6 Sheets.

*Primary Examiner* — Adolf Berhane
*Assistant Examiner* — Gary Nash
(74) *Attorney, Agent, or Firm* — King & Spalding LLP

(57) ABSTRACT

The present disclosure provides techniques for an improved switching module for voltage regulators or transformers with voltage regulating taps. The switching module disclosed herein includes a first bypass switch and a second bypass switch coupled to the first bypass switch, at least one prime mover coupled to and configured to actuate at least one of the first bypass switch and the second bypass switch, and at least one load breaking switch coupled between the first and second bypass switches. In certain example embodiments, a separate prime move is configured to actuate each of the bypass switches and the load breaking switch. In certain other example embodiments, one or more of the bypass switches and the load breaking switch is actuated by a shared prime mover.

18 Claims, 3 Drawing Sheets

(56) References Cited

U.S. PATENT DOCUMENTS

2006/0068242 A1* 3/2006 Norimatsu ........ H01M 8/04544 307/87
2010/0141047 A1* 6/2010 Gibbs ........................ H02J 9/06 307/126
2011/0297517 A1 12/2011 Armstrong et al.

* cited by examiner

SWITCHING MODULE FOR VOLTAGE REGULATOR

CROSS-REFERENCE TO RELATED APPLICATIONS

This application claims priority under 35 U.S.C. §119 to U.S. Provisional Patent Application No. 61/792,531 titled "Switching Module for Voltage Regulator" filed on Mar. 15, 2013, the entirety of which is incorporated by reference herein.

TECHNICAL FIELD

The present disclosure relates to interrupter switching modules for use with tap changers for voltage regulators. Specifically, the techniques of the present disclosure reduce costs and complexity related to mechanical components of switching modules as well as provides improved manufacturability without compromising reliability and switching performance.

BACKGROUND

Tap changers for voltage regulation in uninterrupted switching applications using the principle of reactor switching may include one or more vacuum interrupters to prolong the switching life of the device and avoid fouling the dielectric fluid. Vacuum interrupters have been used in load tap changers to regulate the voltage in power transformers for several decades. In U.S. Pat. No. 3,206,580, McCarty describes an invention mechanically linking one vacuum interrupter and two bypass switches. In U.S. Pat. No. 5,266,759, Dohnal and Neumeyer document substantial improvements to such a system. In these examples, complex linkages are used to transmit actuation forces and mechanically synchronize the tap selector, the bypass switches and the vacuum interrupter, which must all be in close proximity to one another. Thus the tap selector, bypass switches and vacuum interrupter are all built into one large assembly, which complicates manufacturing, assembly, and maintenance processes.

In recent years, alternatives have been proposed to simplify the system by decoupling subsystems and using additional motorized actuators. In U.S. Pat. No. 7,463,010, Dohnal and Schmidbauer describe improvements using separate drive systems for various switching subsystems of the tap changer. Alternatively, in U.S. Patent Publication No. 2011/0297517, Armstrong and Sohail describe a system using two vacuum interrupters, one for each moving contact of the tap selector mechanism, with each vacuum interrupter being actuated by a motorized actuator. Both of these solutions provide substantial improvements to simplify the mechanical systems, however it is the point of the present disclosure to provide further improvements. Dohnal and Schmidbauer's invention maintains a level of mechanical complexity within the vacuum interrupter and bypass switch assembly as it relies upon the use of cams and a parallelogram linkage. The two vacuum-interrupter solution provided by Armstrong and Sohail has cost disadvantages due to the expense of using a second vacuum interrupter as well as a robust drive assembly to overcome contact welding since the vacuum interrupters in such a configuration must be able to withstand fault current loads. For overall cost and performance reasons, the use of one vacuum interrupter with two bypass switches is generally accepted as the preferred method.

For background, FIG. 1 illustrates a voltage regulator tap switching circuit, which includes a tap changer 100, a portion of the series winding 220, an equalizer winding 230, a preventative autotransformer 500, and a terminal 410 which could be connected to either the source or load. The series winding 220 and the equalizer winding 230 are integral parts of the voltage regulator's transformer core and coil assembly. The equalizer winding 230 may be omitted from the circuit at the designer's discretion. The preventative autotransformer is a separate subassembly as is the tap changer 100. Within the tap changer assembly 100, there are a plurality of stationary contacts 150, 160, (In certain cases, there are 8 or more stationary contacts connected to the series winding) which are electrically connected to taps in the series winding 220. Movable contacts 110, 120, connect stationary contacts through the preventive autotransformer 500 and equalizer winding 230 to the source or load terminal 410. A prime mover 196, actuates through a mechanical linkage 198, to position the movable contacts 110, 120 on the appropriate stationary contact to regulate the voltage between the source and load.

For further background, FIG. 2 illustrates a common switching circuit for a reactive switching on-load tap changer as is commonly used in a distribution substation transformer. Many items are substantially similar to those of the voltage regulator circuit shown in FIG. 1. However, additional switching components are integrated to eliminate fouling of the dielectric fluid and prolong the switching life of the device. The circuit includes a subassembly 300 consisting of bypass switches 322, 332, and a vacuum interrupter 312. The utilization of these switches is explained thoroughly in U.S. Pat. No. 5,107,200 to Dohnal and Neumeyer. The on-load tap changer consists of both a tap selector switch 101, of a substantially similar design to the tap changer 100 in FIG. 1, and a switching subassembly 300. To actuate and synchronize the switching subassembly 300 to the tap selector switch 101, there is a mechanical linkage 199, which is powered by a single prime mover 196. In practice, the mechanical linkage 199 is a complex design of shafts, gears, cams, bearings and other mechanical components, all of which require a high degree of component-level and assembly-level precision to function properly. Further, the mechanical linkage 199 creates challenges to efficiently packaging the system due to mechanical constraints of power transmission. As a result, there are cost and manufacturing limitations which are improved by the techniques of the present disclosure.

SUMMARY

According to an aspect of the present disclosure, a load tap changer system includes a tap selector switch, a first prime mover coupled to the tap selector switch and configured to actuate the tap selector switch, and a switching subassembly coupled to the tap selector switch. The switching subassembly includes a first bypass switch, a second bypass switch, at least one secondary prime mover coupled to and configured to actuate at least one of the first bypass switch and the second bypass switch, and at least one load breaking switch coupled between the first and second bypass switches.

According to another aspect of the present disclosure, a tap switching system includes a tap selector switch, a first prime mover coupled to the tap selector switch and configured to actuate the tap selector switch, and a switching subassembly coupled to the tap selector switch. The switching subassembly includes a first bypass switch, a second bypass switch, at least one load breaking switch, a first secondary prime mover coupled to and configured to actuate the first bypass switch and the second bypass switch, and a second secondary prime mover coupled to and configured to actuate the at least one load break switch.

According to another aspect of the present disclosure, a switching subassembly for a load tap changer system includes a first bypass switch, a second bypass switch coupled to the first bypass switch, at least one prime mover coupled to and configured to actuate at least one of the first bypass switch and the second bypass switch, and at least one load breaking switch coupled between the first and second bypass switches.

These and other aspects, objects, features, and embodiments will become apparent to a person of ordinary skill in the art upon consideration of the following detailed description of illustrative embodiments.

BRIEF DESCRIPTION OF THE FIGURES

Reference will now be made to the accompanying drawings, which are not necessarily drawn to scale, and wherein.

Figure 1:
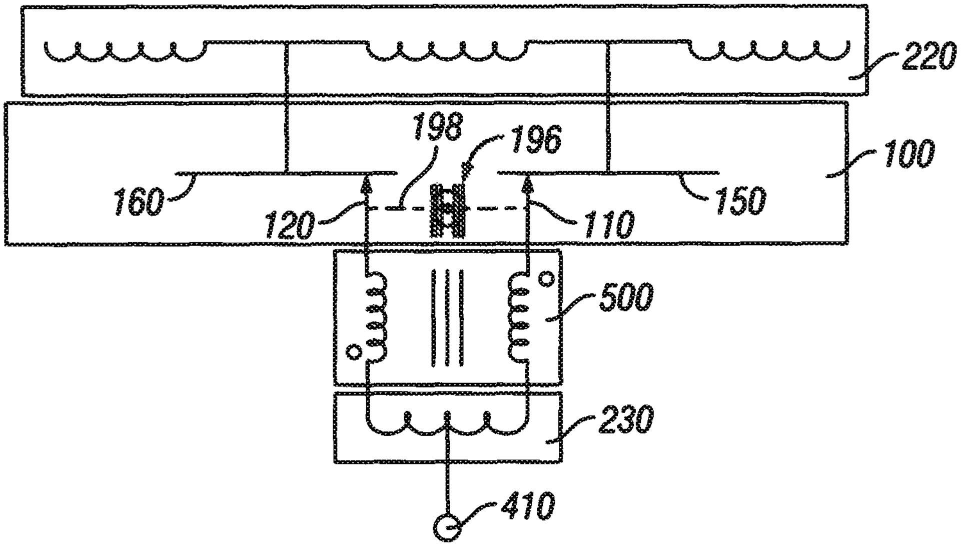
FIG. 1 (Prior Art)
FIG. 1 is a prior art illustration of a voltage regulator tap switching circuit.
Figure 2:
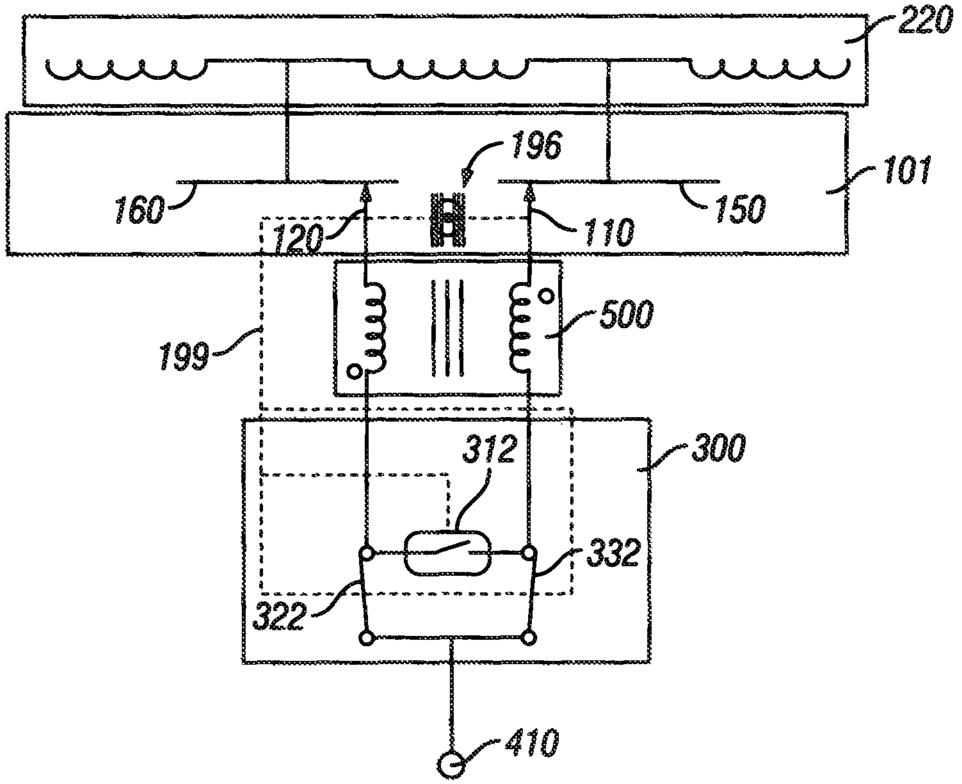
FIG. 2 (Prior Art)
FIG. 2 is a prior art illustration of a voltage regulator tap switching circuit with a switching subassembly consisting of bypass switches and a load-breaking switch.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of the example embodiments. In the drawings, reference numerals designate like or corresponding, but not necessarily identical, elements.

DETAILED DESCRIPTION OF EXAMPLE EMBODIMENTS

Example embodiments disclosed herein are directed to tap changer switching modules for voltage regulators. Specifically, the present disclosure provides an optimized vacuum interrupter switching subassembly for use with tap changers in voltage regulators and voltage regulating transformers. The example voltage regulator circuits provided herein are provided for representative and illustrative purposes and do not restrict the application of the disclosed techniques to these examples. The techniques of the present disclosure can be applied to various types of voltage regulators, transformers and circuits, including those not described herein.

Figure 3:
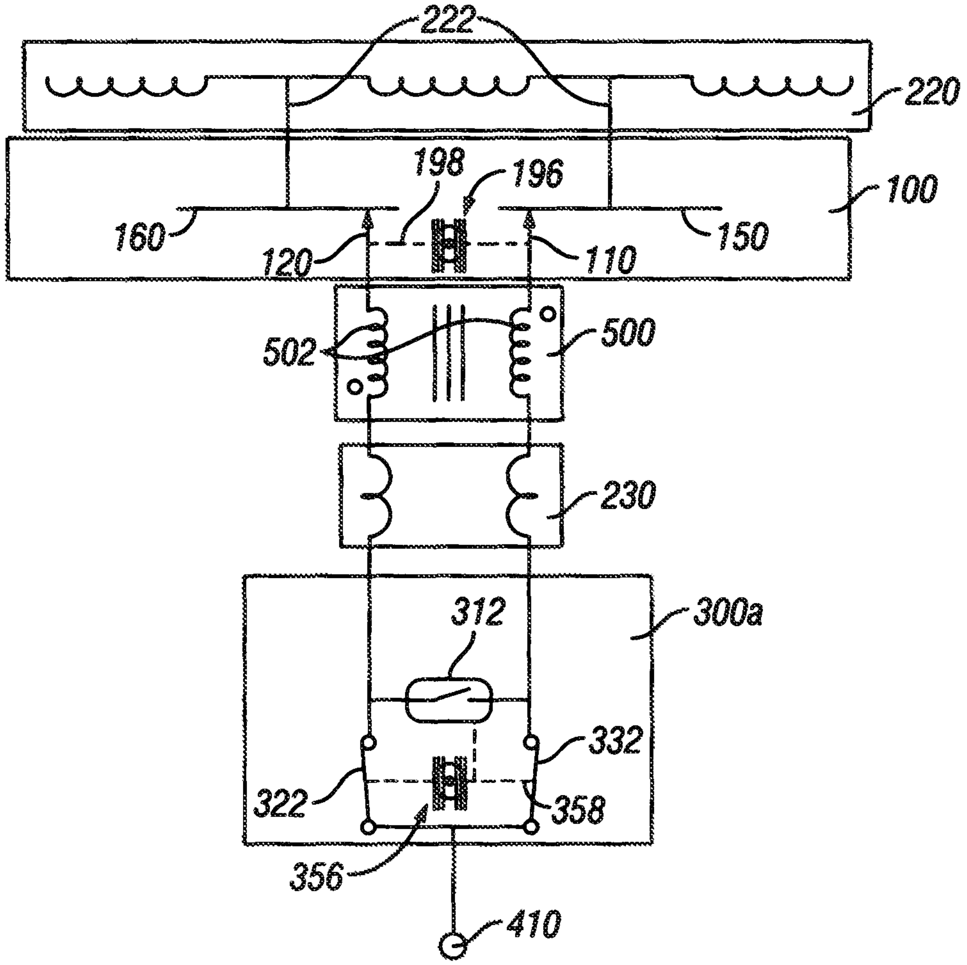
FIG. 3 is a schematic diagram of a voltage regulator tap switching circuit with a first embodiment of a switching subassembly, in accordance with example embodiments of the present disclosure.

FIG. 3 illustrates a voltage regulator tap switching circuit, in accordance with example embodiments of the present disclosure. In certain example embodiments, the circuit includes a series winding 220, a tap selector switch 100, a preventative autotransformer 500, an equalizer winding 230, and a switching subassembly 300*a*. The circuit further includes a terminal 410, which can be electrically coupled to a source or a load. In certain example embodiments, the series winding 220 and the equalizer winding 230 are integral parts of the voltage regulator's transformer core and coil assembly. In certain other example embodiments, the equalizer winding 230 may be omitted from the design. In certain example embodiments, the tap changer 100 further includes a plurality of movable contacts such as a first movable contact 110 and a second movable contact 120. The tap changer 100 also includes a plurality of stationary contacts, such as a first stationary contact 150 and a second stationary contact 160. The stationary contacts 150, 160 are electrically coupled to respective taps 222 in the series winding 220. The movable contacts 110, 120 are electrically coupled to windings 502 in the preventative autotransformer 500. In certain example embodiments, the reactance of the preventative autotransformer is large enough to minimize or avoid short circuit currents during switching operations. The windings 502 of the preventative autotransformer 500 are electrically coupled to the equalizer winding 230 opposite the movable contacts 110, 120. In certain example embodiments, the tap changer 100 further includes a prime mover 196 and a mechanical linkage 198. The prime mover 196 actuates through the mechanical linkage 198 to position the movable contacts 110, 120 into contact with the appropriate stationary contact 150, 160 in order to regulate the voltage accordingly.

In certain example embodiments, the equalizer winding 230 is electrically coupled to the switching subassembly 300*a*. The switching subassembly 300*a* can take a variety of forms and have a variety of components, some examples of which are provided in the following description. In certain example embodiments, the switching subassembly 300*a* includes a first bypass switch 322, a second bypass switch 332, and a load breaking switch 312 such as a vacuum interrupter. In certain example embodiments, the switching subassembly 300*a* further includes a common linkage 358 and a prime mover 356. The equalizer winding 230 is electrically coupled to the first and second bypass switches 322, 332 of the switching subassembly 300, as well as on either side of the load breaking switch 312. In certain example embodiments, the bypass switches 322, 332 as well as the load breaking switch 312 are actuated through the common linkage 358, which is driven by the prime mover 356. In certain example embodiments, the first and second bypass switches 322, 332 are mechanically linked such that simultaneous actuation of the first and second bypass switches 322, 332 is prevented. In certain example embodiments, the load breaking switch 312, the first bypass switch 322, and the second bypass switch 332 include a silicon-controlled rectifier (SRC), an insulated-gate bipolar transistor (IGBT), a metal-oxide-semiconductor field-effect transistor (MOSFET), or another power electronic switching device, or a combination thereof. In certain example embodiments, the load breaking switch 312, first bypass switch 322, and/or second bypass switch 332 comprise a hybrid mechanical and power-electronic switch. In certain example embodiments, the first and second bypass switches 322, 332 are sequenced to the tap selector switch by at least one mechanical relay or electronic device. In certain example embodiments, the load breaking switch 312 is sequenced to the tap selector switch by at least one mechanical relay or electronic device.

The switching subassembly 300*a* provides a simplified drive system. Specifically, the switching subassembly 300*a* benefits from using simple linear drive components rather than a complex mechanical linkage and rotary drive system. In certain example embodiments, a bidirectional solenoid or a voice coil actuator may be used as the prime mover with the benefit of not requiring translation or rotary motion into linear motion in order to operate the bypass switches 322, 332 and the load breaking switch 312. In certain example embodiments, a simple linkage such as a cam riding on the common linkage 358 for the bypass switches 322, 332 can provide the actuation force and synchronization for the load breaking switch 312.

Figure 4:
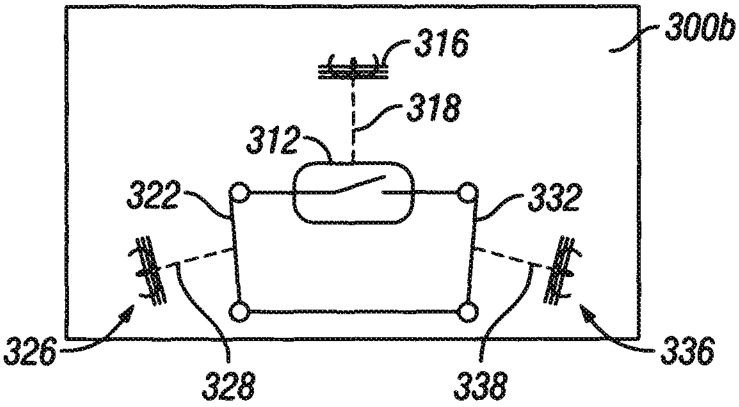
FIG. 4 is a schematic diagram of a voltage regulator tap switching circuit with a second embodiment of a switching subassembly, in accordance with example embodiments of the present disclosure.

FIG. 4 illustrates another example embodiment of a switching subassembly 300*b*, in which the switching subassembly 300*b* is further simplified. Specifically, the switching subassembly 300*b* includes a first bypass switch 322, a second bypass switch 332, and a load breaking switch 312. In certain example embodiments, the switching subassembly 300*b* further includes a first prime mover 316, a second prime mover 326, and a third prime mover 336. The prime movers 316, 326, 336 are respectively associated with a first simplified linkage 318, a second simplified linkage 328, and a third simplified linkage 338. Furthermore, the first prime mover 316 and first simplified linkage 318 are associated with actuation of the load breaking switch 312, the second prime mover 326 and the second simplified linkage 328 are associated with actuation of the first bypass switch 322, and the third prime mover 336 and the third simplified linkage 338 are associated with actuation of the second bypass switch 332. In certain example embodiments, mechanically isolating the first bypass switch 322, the second bypass switch 332, and the load breaking switch 312 from one another provides a more robust design since fewer components contribute variation to other components within the switching subassembly 300*b*. Additionally, in certain example embodiments, the manufacturing process may be also be improved as the load tap changing device, which consists of the tap selector switch 100, the first and second bypass switches 322, 332, and the load breaking switch 312, is separated into smaller subassemblies, which are easier to handle during production and assembly. Furthermore, breaking the system into smaller subassemblies provides the ability to package any of the aforementioned switches on an "engineered-to-order" or customized basis within the voltage regulator or voltage regulating transformer.

Figure 5:
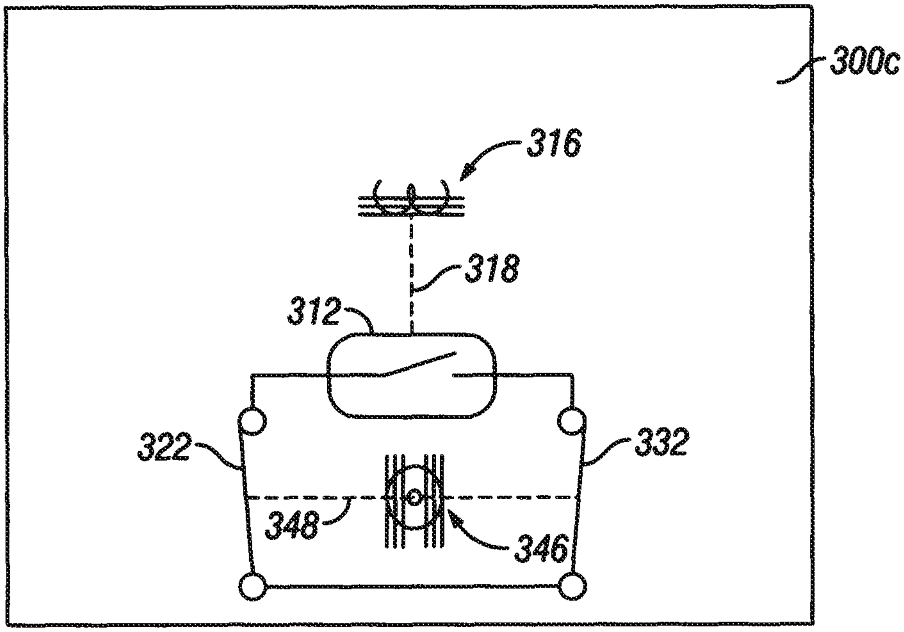
FIG. 5 is a schematic diagram of a third embodiment of a switching subassembly, in accordance with example embodiments of the present disclosure.

FIG. 5 illustrates another example embodiment of the switching subassembly 300*c*. In certain example embodiments, the switching subassembly 300*c* includes a load breaking switch 312, a first bypass switch 322, and a second bypass switch 332. In certain example embodiments, the switching subassembly 300*c* further includes a first prime mover 316 and a first linkage 318. The load breaking switch 312 is actuated by the first linkage 318, which is driven by the first prime mover 316. The switching subassembly 300*c* also includes a second prime mover 346 and a common linkage 348 associated with the second prime mover 346. The common linkage 348 is coupled between the first and second bypass switches 322, 332 for reduction of component count and size, as well as to prevent simultaneous actuation of the bypass switches. In certain example embodiments, the first and second bypass switches 322, 332 are actuated by the second prime mover 346. One example method of sequencing the switch operations uses a logic circuit made up of switching relays that trigger the actuators in the proper order. However, given the present cost and reliability of electronics, it is preferable to use an electronic control system, such as may be provided through the use of a microprocessor, microcontroller, or other programmable electronic device.

Although the disclosures are described with reference to example embodiments, it should be appreciated by those skilled in the art that various modifications are well within the scope of the disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A tap switching system, comprising:
a tap selector switch;
a first prime mover coupled to the tap selector switch and configured to actuate the tap selector switch;
a preventative autotransformer coupled to the tap selector switch;
a switching subassembly, the switching subassembly comprising:
a first bypass switch;
a second bypass switch;
at least one load breaking switch; and
at least one secondary prime mover coupled to and configured to actuate at least one of the first bypass switch, the second bypass switch, and the at least one load breaking switch;
wherein the first bypass switch and the second bypass switch are coupled to the tap selector switch through the preventative autotransformer and without a mechanical linkage connecting the tap selector switch and the switching subassembly.

2. The tap switching system of claim 1, wherein the first bypass switch and the second bypass switch are mechanically linked, and wherein simultaneous actuation of the first and second bypass switches is prevented.

3. The tap switching system of claim 1, wherein the at least one load breaking switch, first bypass switch, and/or second bypass switch comprises a hybrid mechanical and power-electronic switch.

4. The tap switching system of claim 1, wherein a first secondary prime mover is coupled to and configured to actuate the first bypass switch and the second bypass switch, and a second secondary prime mover is coupled to and configured to actuate the at least one load breaking switch.

5. The tap switching system of claim 1, further comprising a first secondary prime mover coupled to and configured to actuate the first bypass switch, a second secondary prime mover coupled to and configured to actuate the second bypass switch, and a third secondary prime mover coupled to and configured to actuate the at least one load breaking switch.

6. The tap switching system of claim 5, wherein the first secondary prime mover actuates the first bypass switch via a first mechanical linkage, the second secondary prime mover actuates the second bypass switch via a second mechanical linkage, and the third secondary prime mover actuates the at least one load breaking switch via a third mechanical linkage.

7. A tap switching system, comprising:
a tap selector switch
a first prime mover coupled to the tap selector switch and configured to actuate the tap selector switch;
a switching subassembly coupled to the tap selector switch, the switching subassembly comprising:
a first bypass switch;
a second bypass switch;
at least one load breaking switch;
a first secondary prime mover coupled to and configured to actuate the first bypass switch and the second bypass switch; and
a second secondary prime mover coupled to and configured to actuate the at least one load break switch.

8. The tap switching system of claim 7, wherein at least one of the first secondary prime mover or the second secondary prime mover is a linearly translating prime mover.

9. The tap switching system of claim 7, wherein the first secondary prime mover actuates the first bypass switch and the second bypass switch via a first mechanical linkage, and the second secondary prime mover actuates the at least one load breaking switch via a second mechanical linkage.

10. A switching subassembly for a tap switching system, comprising:

a first bypass switch;

a second bypass switch coupled to the first bypass switch;

at least one load breaking switch coupled between the first and second bypass switches;

a first prime mover coupled to and configured to actuate the first bypass switch;

a second prime mover coupled to and configured to actuate the second bypass switch; and a third prime mover coupled to and configured to actuate the at least one load breaking switch.

11. The switching subassembly of claim 10, wherein the first bypass switch and the second bypass switch are mechanically linked, wherein simultaneous actuation of the first and second bypass switches is prevented.

12. The switching subassembly of claim 10, wherein the at least one load breaking switch comprises a vacuum interrupter.

13. The switching subassembly of claim 10, wherein the at least one load breaking switch comprises a SCR, IGBT, or MOSFET.

14. The switching subassembly of claim 10, wherein the at least one load breaking switch, first bypass switch, and/or second bypass switch comprises a hybrid mechanical and power-electronic switch.

15. The switching subassembly of claim 10, wherein the bypass switches comprise at least one subassembly and load breaking switch comprises at least one subassembly.

16. The switching subassembly of claim 10, wherein the actuation of the first and second bypass switches and the load breaking switch are controlled by at least one mechanical relay or electronic device.

17. The switching subassembly of claim 10, wherein the switching subassembly is part of a tap switching system, the tap switching system comprising:

a tap selector switch; and a tap selector prime mover coupled to the tap selector switch and configured to actuate the tap selector switch.

18. A tap switching system, comprising:

a tap selector switch;

a first prime mover coupled to the tap selector switch and configured to actuate the tap selector switch;

a switching subassembly, the switching subassembly comprising:

a first bypass switch;

a second bypass switch;

at least one load breaking switch; and at least one secondary prime mover coupled to and configured to actuate the first bypass switch, the second bypass switch, and the at least one load breaking switch.

* * * * *